United States Patent
Jadhav et al.

(10) Patent No.: US 11,647,104 B2
(45) Date of Patent: May 9, 2023

(54) DATA PROCESSING METHOD AND APPARATUS, AND DEVICE

(71) Applicant: Huawei Technologies Co., Ltd., Shenzhen (CN)

(72) Inventors: Rahul Arvind Jadhav, Shenzhen (CN); K Anmol Mani Tejeswar Sarma, Shenzhen (CN); Zhen Cao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 219 days.

(21) Appl. No.: 17/135,397

(22) Filed: Dec. 28, 2020

(65) Prior Publication Data

US 2021/0120107 A1    Apr. 22, 2021

Related U.S. Application Data

(63) Continuation of application No. PCT/CN2020/079524, filed on Mar. 16, 2020.

(30) Foreign Application Priority Data

Mar. 15, 2019    (CN) .......................... 201910200163.7

(51) Int. Cl.
*H04L 47/32*   (2022.01)
*H04L 69/16*   (2022.01)
(Continued)

(52) U.S. Cl.
CPC .............. *H04L 69/16* (2013.01); *H04L 47/27* (2013.01); *H04L 47/283* (2013.01); *H04L 47/32* (2013.01)

(58) Field of Classification Search
CPC .......... B60L 53/60; G06F 6/545; G06F 3/041; H01H 71/1081; H02B 1/056; H02B 1/20;
(Continued)

(56) References Cited

U.S. PATENT DOCUMENTS 7,065,581 B2    6/2006 Dierks, Jr. et al.
7,613,813 B2 *  11/2009 Hussain ............... H04L 49/901
                                                710/316
(Continued)

FOREIGN PATENT DOCUMENTS

CN    101982955 A    3/2011
CN    102202094 A    9/2011
(Continued)

OTHER PUBLICATIONS

Hellmann Doug, "Select—Wait for I/O Efficiently—Python Module of theWeek Platform-specific Options," Jun. 24, 2018, XP055836019, Retrieved from the Internet: URL:https://web. archive.org/web/20180624082628/https ://pymotw.com/2/select/, 14 pages.
(Continued)

*Primary Examiner* — Phuc H Tran
(74) *Attorney, Agent, or Firm* — Conley Rose, P.C.

(57) ABSTRACT

A data processing method includes receiving, by an operating system of a device, a start instruction from an application in the device that includes an identifier of a socket connection, where the application is a latency-insensitive application, calling, by the operating system according to the start instruction, a monitoring system in the operating system to monitor buffering of data of the socket connection in a kernel buffer, where the data of the socket connection is from an underlying protocol stack, and generating, by the monitoring system, a data readable identifier when a time interval between a current moment and a start moment is greater than or equal to a timeout duration, where the start moment is when the operating system receives the start instruction, and the data readable identifier indicates that the data of the socket connection is readable by the application.

20 Claims, 4 Drawing Sheets

(51) Int. Cl.
  *H04L 47/27* (2022.01)
  *H04L 47/283* (2022.01)
(58) Field of Classification Search
  CPC ...... H02B 1/24; H02J 13/00002; H02J 3/381;
      H02J 7/0068; H04L 47/27; H04L 47/283;
      H04L 47/32; H04L 69/16; H04L 69/161;
      H04L 67/141; H04L 67/146; H04L
      69/162; Y02T 10/70; Y02T 10/7072;
      Y02T 90/12; H02M 3/00; H02S 40/00;
      Y02E 10/50
  See application file for complete search history.

(56) References Cited

U.S. PATENT DOCUMENTS

| | | | |
|---|---|---|---|
| 2003/0002508 A1 | 1/2003 | Dierks et al. | |
| 2003/0231657 A1 | 12/2003 | Poon et al. | |
| 2006/0075119 A1* | 4/2006 | Hussain | H04L 69/162 709/227 |
| 2009/0103515 A1 | 4/2009 | Pointer | |

FOREIGN PATENT DOCUMENTS

| | | |
|---|---|---|
| CN | 102761518 A | 10/2012 |
| CN | 103888441 A | 6/2014 |
| CN | 106201830 A | 12/2016 |
| CN | 108156172 A | 6/2018 |
| CN | 109088799 A | 12/2018 |
| CN | 105940658 B | 4/2019 |

OTHER PUBLICATIONS

R. Braden,"Requirements for Internet Hosts—Communication Layers",Network Working Group, Internet Engineering Task Force, Request for Comments: 1122, Oct. 1989, total 116 pages.
Livio Soares et al.,"FlexSC: Flexible System Call Scheduling with Exception-Less System Calls", OSDI" 10: Proceedings of the 9th USENIX conference on Operating systems design and implementation, Oct. 2010, total 14 pages.
IEEE Std 1003.1-2017, (Revision of IEEE Std 1003.1-2008), IEEE Standard for Information Technology—Portable Operating System Interface (POSIX ), Base Specifications, Issue 7, total 3951 pages.
Yanzi Zhu et al.,"Trimming the Smartphone Network Stack", HotNets-XV, Nov. 9-10, 2016, Atlanta, GA, USA, total 7 pages.
W. Richard Stevens et al.,"UNIX Network Programming(vol. 1,3rd)", Nov. 21, 2003, total 1094 pages.

* cited by examiner

DATA PROCESSING METHOD AND APPARATUS, AND DEVICE

CROSS-REFERENCE TO RELATED APPLICATIONS

This application is a continuation of International Patent Application No. PCT/CN2020/079524 filed on Mar. 16, 2020, which claims priority to Chinese Patent Application No. 201910200163.7 filed on Mar. 15, 2019. The disclosures of the aforementioned applications are hereby incorporated by reference in their entireties.

TECHNICAL FIELD

This application relates to the field of communications technologies, and in particular, to a data processing method and apparatus, and a device.

BACKGROUND

As mobile Internet access has become a main characteristic of a device (such as a terminal), a technical solution used by the device to access a network continuously develops, thereby greatly improving an information obtaining rate of a device product. Transmission Control Protocol (TCP) commonly used in the field of mobile communications is a connection-oriented, reliable, and byte stream-based transport layer communications protocol.

Generally, a system call is a combination of a series of complex operations. During the system call, use of a central processing unit (CPU) in the device is triggered, and even an operation such as internal memory copy in the device is performed. Currently, in a process in which the device accesses the network using TCP, an application program in a user mode receives data from a TCP protocol stack in a kernel mode through a plurality of system calls. For example, the application program may call a select( ) function to monitor a status of a socket connection, and then call a read( ) function to read data. However, excessively frequent system calls tend to cause a waste of CPU resources and increase power consumption of the device.

SUMMARY

This application provides a data processing method and apparatus, and a device such that a data buffering process can be optimized through time restriction, and a process in which an application obtains data from an operating system better meets an actual requirement, thereby reducing a quantity of system calls.

According to a first aspect, this application provides a data processing method, including receiving, by an operating system of a device, a start instruction sent by an application in the device, where the application is a latency-insensitive application, and the start instruction includes an identifier of a socket connection, calling, by the operating system according to the start instruction, a monitoring module to monitor a case about buffering data of the socket connection in a kernel buffer, where the data of the socket connection is from an underlying protocol stack, and generating, by the monitoring module, a data readable identifier when a time interval between a current moment and a start moment is greater than or equal to timeout duration, where the start moment is a moment at which the operating system receives the start instruction, and the data readable identifier indicates that the data of the socket connection received in the kernel buffer is readable by the application.

The device in this application may be a network device or a terminal device. This is not limited in this application.

A network device may be a base station, an access point, or an access network device, or may be a device in communication with a wireless terminal via one or more sectors at an air interface in an access network. The network device may be configured to mutually convert a received over-the-air frame and an Internet Protocol (IP) packet and serve as a router between the wireless terminal and a rest portion of the access network, where the rest portion of the access network may include an IP network. The network device may coordinate attribute management of the air interface. For example, the network device may be a base transceiver station (BTS) in Global System for Mobile Communications (GSM) or code division multiple access (CDMA), or a NodeB (NB) in wideband CDMA (WCDMA), or an evolved NodeB (eNB or eNodeB) in Long-Term Evolution (LTE), or a relay node or an access point, or a base station in a future fifth generation (5G) network, for example, a gNB. This is not limited herein. A terminal device may be a wireless terminal or a wired terminal. The wireless terminal may refer to a device that provides a user with voice and/or other service data connectivity, a handheld device with a radio connection function, or another processing device connected to a radio modem. The wireless terminal may communicate with one or more core networks through a radio access network (RAN). The wireless terminal may be a mobile terminal, such as a mobile phone (or a cellular phone) and a computer with a mobile terminal, for example, may be a portable, pocket-sized, handheld, computer built-in, or vehicle-mounted mobile apparatus, which exchanges voice and/or data with the RAN. For example, it may be a device such as a Personal Communications Service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile terminal, a remote station, a remote terminal, an access terminal, a user terminal, a user agent, a user device (or user equipment). The present disclosure is not limited thereto.

Software of the device includes the operating system and an application running in a user mode in the operating system. The operating system may include but is not limited to LINUX, ANDROID, and another system. The software of the device is stored in a memory of the device.

The operating system may be divided into a user mode and a kernel mode. Locations of different protocols are slightly different. For example, a Quick User Datagram Protocol (UDP) Internet Connection (QUIC) protocol, and a custom protocol are user-mode protocols, and TCP, a UDP, and a Stream Control Transmission Protocol (SCTP) are kernel-mode protocols.

Generally, an application exchanges information with a kernel operating system through an application programming interface (API). The API may be a set of socket interface functions. This set of interface functions includes a function socket( ) and the socket( ) may implement a plurality of functionalities, that is, a plurality of modules, for example, a monitoring module (that is, implement a functionality of monitoring various connection status parameters such as TCP using a select( ) function), a receiving module (that is, implement a receiving functionality using a receive ( ) function), a sending module (that is, implement a sending functionality using a send( ) function), a writing module (that is, implement a writing functionality using a write( ) function), and a reading module (that is, implement a reading functionality using a read( ) function). The API may be developed by a user, or may be obtained by improving an existing API. Certainly, the foregoing description is merely an example. A functionality may be implemented in a plurality of manners. For example, the functionality may be implemented using a plurality of functions, or may be implemented in cooperation with a plurality of functions in an implementation. This is not limited in this application. For example, an implementation of the monitoring module in some scenarios may be a poll( ) function.

In this application, there may be one or more socket connections between each application and the kernel operating system, each socket connection corresponds to one socket, and each socket has one set of socket interface functions. Therefore, both the application and the kernel operating system may perform operations such as data sending and receiving, real-time status obtaining, and information exchange using this set of socket interface functions.

For example, the kernel operating system or the application may call a select( ) function in a socket to perform real-time monitoring on various status parameters related to a socket connection, for example, a status identifier of a connection between the kernel operating system and the application, the identifier of the socket connection, and a data readable identifier, or may call a read( ) function in the socket to read data.

The application may determine, by determining whether a communication requirement type set by the application is a latency-insensitive type, or may determine, based on whether data buffered in the application is greater than a preset value, whether the application is currently a latency-insensitive application. The preset value may be set based on actual experience. This is not limited in this application.

Further, an interface SO_RCVLOWAT_TIMEOUT may be set in the application and the operating system. Therefore, when the application is a latency-insensitive application, the application may call the interface SO_RCVLOWAT_TIMEOUT to send, to the operating system, the start instruction including the identifier of the socket connection, to notify, using the start instruction, the operating system that the application may currently slowly receive the data of the socket connection received in the kernel buffer.

A specific structure of the interface SO_RCVLOWAT_TIMEOUT is as follows:

```
struct rcvlowat_timeout Interface name {
uint32_t rcvlowat; Lowest water mark
uint64_t timeout; Timeout duration
};
``` where, parameters rcvlowat and timeout may be omitted.

In this application, before the application sends the start instruction to the operating system, the application needs to learn of the identifier of the socket connection. The socket connection may be established in advance, or may be established before the start instruction is sent. There may be one or more socket connections.

The following uses a process of establishing one socket connection as an example to describe in detail a specific process in which the application learns of the identifier of the socket connection.

The application may send a connection establishment instruction to the operating system, for example, an input/output (I/O) operation instruction. The connection establishment instruction may be some actions or behavior performed by the user on the application, or may be generated by the application in a running process to execute a task.

For example, the application is a browser, and the user clicks a link displayed on the browser, or enters an account or a password of a website. In this case, data of the link or the account or the password entered by the user is the connection establishment instruction sent by the application to the operating system.

For another example, the application is a video player. To buffer a video watched by the user in the video player, request data that needs to be sent to the operating system is generated. In this case, the request data is the connection establishment instruction.

It should be noted that, in addition to passively receiving the connection establishment instruction sent by the application, the operating system may monitor a network in real time by calling the monitoring module, and wait for a connection establishment request sent by the application.

Further, the operating system may establish, based on the connection establishment request, the socket connection corresponding to the application, allocate the corresponding identifier to the socket connection, and store the identifier of the socket connection in a local buffer, where data in the local buffer may be stored in the memory of the device. Further, the application may read the identifier of the socket connection from the local buffer.

The identifier of the socket connection is used to uniquely indicate the socket connection such that the operating system can determine, based on the identifier, the corresponding socket connection, the application corresponding to the socket connection, and a set of socket interface functions corresponding to the socket connection. A specific implementation form of the identifier is not limited in this application. For example, the identifier may be a file descriptor (FD) of the socket connection.

In this application, the start instruction may be a packet in the other approaches, or may be in another form. This is not limited in this application. For example, the start instruction enables, in a form of a frame header and a data packet, the identifier of the socket connection to be carried in the data packet.

Further, specific content of the start instruction is not limited in this application either. When the start instruction includes the identifier of the socket connection, the operating system may determine, based on a prestored mapping relationship between the identifier of the socket connection, and a lowest water mark and timeout duration, the lowest water mark and the timeout duration that are corresponding to the identifier of the socket connection.

A manner in which the operating system determines the lowest water mark and the timeout duration is not limited in this application. Optionally, the operating system may prestore a table including the identifier of the socket connection, the lowest water mark, and a mapping relationship between the identifier of the socket connection and the lowest water mark such that the operating system can determine, through table lookup, the lowest water mark corresponding to the identifier of the socket connection. Correspondingly, the operating system may prestore a table including the identifier of the socket connection, the timeout duration, and a mapping relationship between the identifier of the socket connection and the timeout duration such that the operating system can determine, through table lookup, the timeout duration corresponding to the identifier of the socket connection. The mapping relationship may be in a form of code, a number, an identifier, or the like.

Further, the application may alternatively add the lowest water mark and/or the timeout duration to the start instruction such that the operating system can determine a communication requirement type of the current application based on the received lowest water mark and/or timeout duration, to adjust a data receiving rate of the application to meet an actual requirement of the application.

In addition, the operating system may determine the lowest water mark based on the timeout duration, or may determine the timeout duration based on the lowest water mark. For a specific manner, refer to specific content of determining the lowest water mark and the timeout duration based on the identifier of the socket connection. Details are not described herein again.

In this application, the operating system may call the monitoring module to monitor the case about buffering the data of the socket connection in the kernel buffer. That is, the operating system may call a select( ) function, and may obtain status information returned by the select( ) function. The status information indicates the case about buffering the data of the socket connection in the kernel buffer.

The case may be duration of buffering the data of the socket connection in the kernel buffer, or may be an amount of the data of the socket connection buffered in the kernel buffer, or may be another parameter. This is not limited in this application.

The monitoring module may use a timer to determine whether the duration of buffering the data of the socket connection in the kernel buffer exceeds the timeout duration, that is, whether the time interval between the current moment and the start moment is greater than or equal to the timeout duration. The monitoring module may start the timer at a moment of receiving the start instruction (i.e., the start moment), and set duration of the timer to the timeout duration. Further, the monitoring module determines, by performing monitoring to learn whether the timer generates an identifier, whether the time interval between the current moment and the start moment is greater than or equal to the timeout duration. The timer may be preset by the monitoring module, or may be temporarily set when the start instruction is received.

When the monitoring module receives a non-timeout identifier or does not receive any identifier, the monitoring module may determine that the time interval between the current moment and the start moment is less than the timeout duration. When the monitoring module receives a timeout identifier, the monitoring module may determine that the time interval between the current moment and the start moment is greater than or equal to the timeout duration.

In this application, the start moment and the current moment may be represented in a same manner, thereby facilitating calculation of the time interval between the current moment and the start moment.

The timer in this application may be implemented in a plurality of manners. This is not limited. For example, the timer may be counted down, and timeout means that a time of the timer elapses.

The start moment and the current moment each may be an absolute time. For example, if the start moment is 10:10 and the current moment is 10:11, the time interval between the current moment and the start moment is one minute. The start moment and the current moment each may be alternatively a relative time. For example, if the start moment is 0, and the current moment is 10 seconds (s) starting from 0, the time interval between the current moment and the start moment is 10 s.

The data of the socket connection may not be received in the kernel buffer. Therefore, to prevent the application from reading null data, when the time interval between the current moment and the start moment is greater than or equal to the timeout duration, the operating system may call the monitoring module to determine whether the data of the socket connection is buffered in the kernel buffer.

Further, when the data of the socket connection is buffered in the kernel buffer, the application may receive a first data readable identifier generated by the monitoring module. When determining that the data of the socket connection is not buffered in the kernel buffer, the monitoring module may continue waiting to receive the data of the socket connection, or exit by triggering another event, thereby reducing a quantity of system calls and reducing processing pressure of the device.

Further, impact of the two parameters: the timeout duration and the lowest water mark, is considered. In a process of performing monitoring to learn whether the time interval between the current moment and the start moment exceeds the timeout duration, the monitoring module may further perform monitoring to learn whether the data of the socket connection buffered in the kernel buffer exceeds the lowest water mark. That is, in a process from calling, by the operating system according to the start instruction, the monitoring module to monitor the kernel buffer to sending, by the monitoring module, the data readable identifier to the application, the monitoring module performs monitoring to learn whether the data of the socket connection buffered in the kernel buffer exceeds the lowest water mark.

When the time interval between the current moment and the start moment is less than the timeout duration, the monitoring module may perform monitoring to learn whether the data of the socket connection buffered in the kernel buffer exceeds the lowest water mark. Further, once the monitoring module learns, through monitoring, that the data of the socket connection in the kernel buffer is greater than or equal to the lowest water mark, that is, maximum available space of the data to be received by the application in the kernel buffer is full, the monitoring module may generate a second data readable identifier such that the application reads the received data of the socket connection in time based on the second data readable identifier, thereby reducing storage pressure of the kernel buffer and storage costs of the device. Otherwise, if the data of the socket connection buffered in the kernel buffer does not exceed the lowest watermark, the monitoring module in the operating system may continue performing monitoring to learn whether the time interval between the current moment and the start moment is greater than or equal to the timeout duration, and perform step S103 when the time interval between the current moment and the start moment is greater than or equal to the timeout duration.

Specific forms of the first data readable identifier and the second data readable identifier may be the same or may be different, and may be in a form of an identifier, a number, code, or the like. This is not limited in this application. For example, when the first data readable identifier and the second data readable identifier are "1", it indicates that the data is readable. When the first data readable identifier and the second data readable identifier are "0", it indicates that the data is unreadable.

According to the data processing method provided in the first aspect, when the application in the device is a latency-insensitive application, the application may send the start instruction including the identifier of the socket connection to the operating system of the device, and the operating system may determine that the current application may slowly receive the data. The operating system calls, according to the start instruction, the monitoring module to monitor the case about buffering the data of the socket connection in the kernel buffer, where the data of the socket connection is from the underlying protocol stack. Further, the monitoring module generates the data readable identifier when the time interval between the current moment and the start moment is greater than or equal to the timeout duration, and the operating system may receive the data readable identifier generated by the monitoring module, where the start moment is the moment at which the operating system receives the start instruction, and the data readable identifier indicates that the data of the socket connection received in the kernel buffer is readable by the application. Therefore, the operating system may send the data of the socket connection received in the kernel buffer to a receive window of the socket connection such that the application can call, based on the data readable identifier generated by the monitoring module, the reading module to read the data of the socket connection from the receive window corresponding to the socket connection. In this application, a data buffering process is optimized through time restriction, and a process in which the application slowly receives the data is implemented to meet an actual requirement of the application such that a balance between device consumption and a latency is optimal, a problem that an additional system call is required due to an insufficient data amount is resolved, and an energy loss of the device is reduced, thereby saving resources of the device and reducing power consumption of the device.

In a possible design, the monitoring module includes a timer, duration of the timer is the timeout duration, and the method further includes starting, by the operating system, the timer according to the start instruction.

In a possible design, the method further includes, when the timer expires, determining, by the monitoring module, that the data of the socket connection is buffered in the kernel buffer.

In a possible design, calling, by the operating system according to the start instruction, a monitoring module to monitor a case about buffering data of the socket connection in a kernel buffer includes calling, by the operating system according to the start instruction, the monitoring module to perform monitoring to learn whether the data of the socket connection buffered in the kernel buffer exceeds a lowest water mark.

The lowest water mark is maximum available space of the data to be received by the application in the kernel buffer.

Generally, if the available space of the data to be received by the application in the kernel buffer is larger, a larger value may be set for the lowest water mark. If a latency of a network used by the socket connection is less sensitive, a larger value may be set for the lowest water mark. If a packet loss rate of the network used by the socket connection is lower, a larger value may be set for the lowest water mark. If bandwidth of the network used by the socket connection is wider, a larger value may be set for the lowest water mark. If a maximum value of the receive window corresponding to the socket connection is larger, a larger value may be set for the lowest water mark. Generally, the lowest water mark is less than the maximum value of the receive window. If the lowest water mark is greater than or equal to the maximum value of the receive window, the maximum value of the receive window may be re-adjusted to be several times the lowest water mark.

The communication requirement type is a characteristic of exchanging data between the application and the operating system in a communication process. The communication requirement type may be determined using an attribute of the application or parameters such as an upload amount and a download amount of the application, and may include but is not limited to a throughput requirement type and a latency requirement type.

Further, the application may be a high-throughput application, a low-throughput application, a latency-insensitive application, a latency-sensitive application, or the like. For example, an application A is a file storage application program, and it may be determined, based on an attribute of the application A, that the application A is a latency-insensitive application. For another example, the application A is a video player, and it may be determined, based on an attribute of the application A, that the application A is a latency-sensitive application. However, when the application A has 50% video buffering, it may be determined that the application A is a latency-insensitive application. Generally, for a latency-insensitive application, a larger value may be set for the lowest water mark, and for a latency-sensitive application, a smaller value may be set for the lowest water mark.

In a possible design, calling, by the operating system according to the start instruction, the monitoring module to perform monitoring to learn whether the data of the socket connection buffered in the kernel buffer exceeds a lowest water mark includes, in a process from calling, according to the start instruction, the monitoring module to monitor the kernel buffer to sending, by the monitoring module, the data readable identifier to the application, learning, by the monitoring module through monitoring, that the data of the socket connection buffered in the kernel buffer does not exceed the lowest water mark.

In a possible design, the timeout duration is set based on at least one of the following indicators: a latency of a network used by the socket connection, bandwidth of the network used by the socket connection, a packet loss rate of the network used by the socket connection, and a communication requirement type of the application.

The timeout duration is maximum duration of buffering the data of the socket connection in the kernel buffer. Generally, if the latency of the network used by the socket connection is less sensitive, a larger value may be set for the timeout duration. If the packet loss rate of the network used by the socket connection is lower, a larger value may be set for the timeout duration. If the bandwidth of the network used by the socket connection is wider, a larger value may be set for the timeout duration.

For the communication requirement type of the application, refer to specific content of the communication requirement type of the application when the lowest water mark is set in this application. Details are not described herein again. Generally, for a latency-insensitive application, a larger value may be set for the timeout duration, and for a latency-sensitive application, a smaller value may be set for the timeout duration.

In a possible design, the lowest water mark is set based on at least one of the following indicators: available space of the data to be received by the application in the kernel buffer, a latency of a network used by the socket connection, a packet loss rate of the network used by the socket connection, bandwidth of the network used by the socket connection, a maximum value of a receive window corresponding to the socket connection, and a communication requirement type of the application.

In a possible design, the monitoring module is a select( ) function.

In a possible design, the operating system stores a mapping relationship between the identifier of the socket connection and the timeout duration.

In a possible design, the start instruction further includes the timeout duration.

According to a second aspect, this application provides a data processing apparatus, including a receiving module configured to receive a start instruction sent by an application in a device, where the application is a latency-insensitive application, and the start instruction includes an identifier of a socket connection, a processing module configured to call, according to the start instruction, a monitoring module to monitor a case about buffering data of the socket connection in a kernel buffer, where the data of the socket connection is from an underlying protocol stack, and the monitoring module, further configured to generate a data readable identifier when a time interval between a current moment and a start moment is greater than or equal to timeout duration, where the start moment is a moment at which an operating system of the device receives the start instruction, and the data readable identifier indicates that the data of the socket connection received in the kernel buffer is readable by the application.

In a possible design, the monitoring module includes a timer, duration of the timer is the timeout duration, and the processing module is further configured to start the timer according to the start instruction.

In a possible design, the monitoring module is further configured to, when the timer expires, determine that the data of the socket connection is buffered in the kernel buffer.

In a possible design, the processing module is further configured to call, according to the start instruction, the monitoring module to perform monitoring to learn whether the data of the socket connection buffered in the kernel buffer exceeds a lowest water mark.

In a possible design, the monitoring module is configured to, in a process from calling, according to the start instruction, the monitoring module to monitor the kernel buffer to sending, by the monitoring module, the data readable identifier to the application, learn, through monitoring, that the data of the socket connection buffered in the kernel buffer does not exceed the lowest water mark.

In a possible design, the timeout duration is set based on at least one of the following indicators: a latency of a network used by the socket connection, bandwidth of the network used by the socket connection, a packet loss rate of the network used by the socket connection, and a communication requirement type of the application.

In a possible design, the lowest water mark is set based on at least one of the following indicators: available space of the data to be received by the application in the kernel buffer, a latency of a network used by the socket connection, a packet loss rate of the network used by the socket connection, bandwidth of the network used by the socket connection, a maximum value of a receive window corresponding to the socket connection, and a communication requirement type of the application.

In a possible design, the monitoring module is a select( ) function.

In a possible design, the operating system stores a mapping relationship between the identifier of the socket connection and the timeout duration.

In a possible design, the start instruction further includes the timeout duration.

For beneficial effects of the data processing apparatus provided in the second aspect and the possible designs of the second aspect, refer to the beneficial effects brought by the first aspect and the possible implementations of the first aspect. Details are not described herein again.

According to a third aspect, this application provides a device, including a memory and a processor, where the memory is configured to store a program instruction, and the processor is configured to call the program instruction in the memory, to perform the data processing method in any one of the first aspect and the possible designs of the first aspect.

According to a fourth aspect, this application provides a readable storage medium. The readable storage medium stores an executable instruction, and when at least one processor of a device executes the executable instruction, the device performs the data processing method in any one of the first aspect and the possible designs of the first aspect.

According to a fifth aspect, this application provides a program product. The program product includes an executable instruction, and the executable instruction is stored in a readable storage medium. At least one processor of a device may read the executable instruction from the readable storage medium, and the at least one processor executes the executable instruction to enable the device to perform the data processing method in any one of the first aspect and the possible designs of the first aspect.

According to a sixth aspect, this application provides a chip. The chip is connected to a memory, or the memory is integrated into the chip, and when a software program stored in the memory is executed, the data processing method in any one of the foregoing designs is implemented.

DESCRIPTION OF EMBODIMENTS

A device in this application may be a network device or a terminal device. This is not limited in this application.

A network device may be a base station, or an access point, an access network device, or may be a device in communication with a wireless terminal via one or more sectors at an air interface in an access network. The network device may be configured to mutually convert a received over-the-air frame and an IP packet and serve as a router between the wireless terminal and a rest portion of the access network, where the rest portion of the access network may include an IP network. The network device may coordinate attribute management of the air interface. For example, the network device may be a BTS in GSM or CDMA, or an NB in WCDMA, or an eNB in LTE, or a relay node or an access point, or a base station in a future 5G network, for example, a gNB. This is not limited herein.

A terminal device may be a wireless terminal or a wired terminal. The wireless terminal may refer to a device that provides a user with voice and/or other service data connectivity, a handheld device with a radio connection function, or another processing device connected to a radio modem. The wireless terminal may communicate with one or more core networks through a RAN. The wireless terminal may be a mobile terminal, for example, a mobile phone (or a cellular phone) or a computer with a mobile terminal, or may be a portable, pocket-sized, handheld, computer built-in, or vehicle-mounted mobile apparatus, which exchanges voice and/or data with the RAN. For example, the wireless terminal may be a device such as a PCS phone, a cordless telephone set, a SIP phone, a WLL station, or a PDA. The wireless terminal may also be referred to as a system, a subscriber unit, a subscriber station, a mobile station, a mobile terminal, a remote station, a remote terminal, an access terminal, a user terminal, a user agent, a user device (or user equipment). The present disclosure is not limited thereto.

Figure 1:
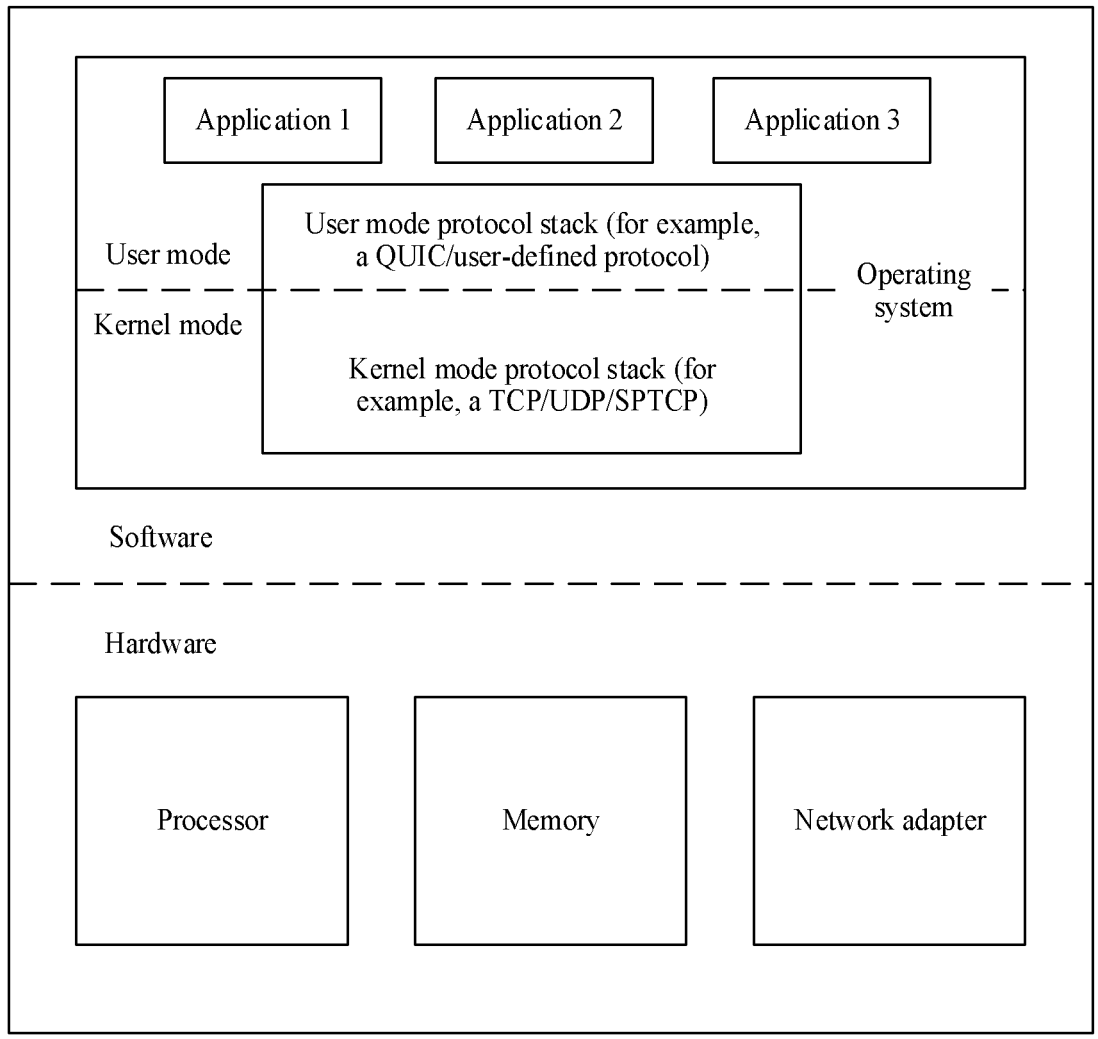
FIG. 1 is a schematic diagram of an architecture of a device according to an embodiment of this application.

FIG. 1 is a schematic architectural diagram of a device according to an embodiment of this application. As shown in FIG. 1, the device may include hardware and software.

The hardware of the device includes various hardware components or apparatuses, such as a memory, a processor, and a network adapter used for network interconnection.

The memory includes a flash storage, an internal memory, and a memory controller.

The flash storage has a characteristic that data is not lost after a power outage occurs, and is configured to store data required by a storage device, such as a program and a parameter required during running of the program, for example, a boot program, an operating system kernel, and a reset program. The flash storage may include a plurality of types of memories, for example, an embedded MultiMediaCard (eMMC) or a Universal Flash Storage (UFS) memory.

The internal memory is characterized by a high data read/write speed, and is configured to provide a buffering area for data that needs to be used during running of the processor. The internal memory may include various types of random-access memories (RAMs), for example, a double data rate (DDR) synchronous dynamic RAM (SDRAM).

The memory controller is configured to decode various read/write requests of the memory sent by the processor. The memory controller may be an independent component separated from the processor, or may be integrated into the processor, and is configured to specially manage an access request of the corresponding memory.

The processor includes one or more CPUs, and each CPU may usually include a BizLet component, a register component, and a control component. The CPU may be separately disposed, or may be integrated. For example, the processor may be a system on chip (SOC) including at least two CPUs.

There may be one or more network adapters. If there is one network adapter, a plurality of network adapters is virtualized using a virtual network adapter technology to support a plurality of networks. If there are a plurality of network adapters, each network adapter may support one network, or at least one of the network adapters may use the virtual network adapter technology.

For example, in a terminal, different network adapters are separately configured to connect to a cellular network and WI-FI. For another example, if one terminal supports two mobile communication numbers, for example, two subscriber identity module (SIM) cards may be simultaneously mounted, and the two cellular networks may be used to perform multipath transmission, the two mobile communication numbers separately use different network adapters.

The software of the device includes an operating system and an application (an application 1, an application 2, and an application 3 are used as an example for illustration in FIG. 1) running in a user mode in the operating system. The operating system may include but is not limited to LINUX, ANDROID, and another system. The software of the device is stored in the memory of the device.

The operating system may be divided into a user mode and a kernel mode. Locations of different protocols are slightly different. For example, a QUIC Protocol, and a custom protocol are user-mode protocols, and TCP, a UDP, and an SCTP are kernel-mode protocols.

Figure 2:
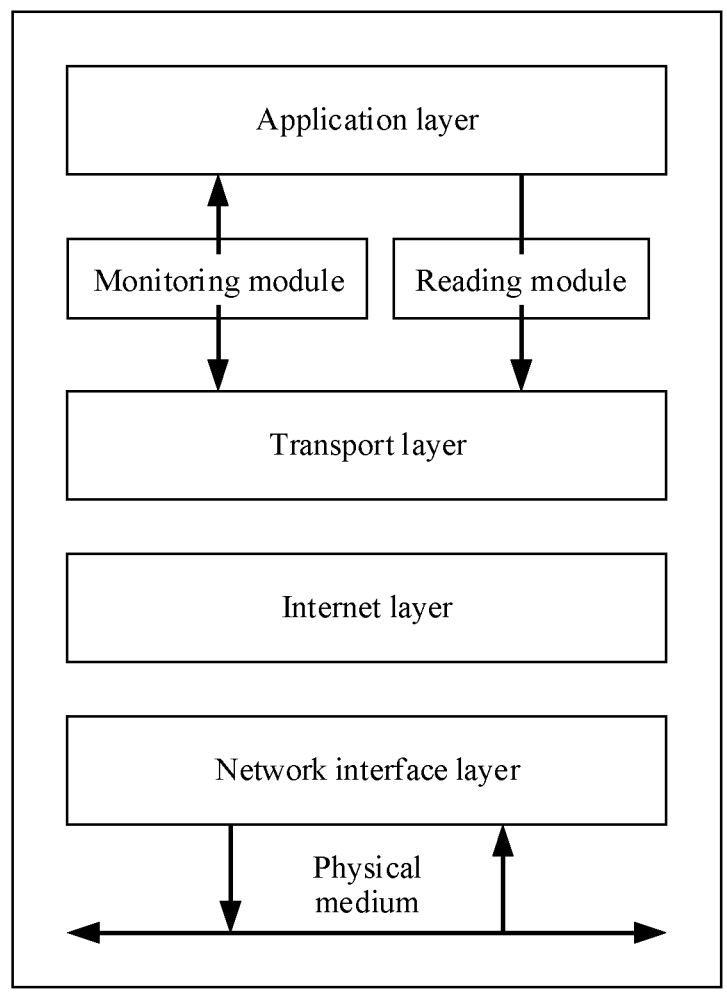
FIG. 2 is a schematic diagram of an architecture of software of a device according to an embodiment of this application.

A method described in this application may be stored in the memory in FIG. 1 in a form of code, and is implemented in software through calling of the processor, for example, a protocol stack of TCP in FIG. 2. Because TCP crosses both the kernel mode and the user mode, for ease of description, a data processing method in this application is described in detail using the protocol stack of TCP as an example. For another protocol, refer to a specific process of TCP. Details are not described in this application.

FIG. 2 describes relative locations of various protocols in this application from a perspective of a protocol stack. As shown in FIG. 2, the protocol stack of TCP may include a network interface layer, an Internet layer, a transport layer, and an application layer from bottom to top.

The network interface layer corresponds to a physical layer and a data link layer in an Open Systems Interconnection (OSI) 7-layer reference model, and is configured to receive an IP packet in a network medium and transmit the IP packet through a specific network, or receive a physical frame from a network, extract an IP packet, and forward the IP packet to the Internet layer.

The Internet layer (network layer, that is, IP layer) corresponds to a network layer in the OSI 7-layer reference model, and may include but is not limited to IP, an Internet Control Message Protocol (ICMP), an Address Resolution Protocol (ARP), and a Reverse ARP (RARP). The Internet layer is responsible for communication between devices in a same network or different networks, and mainly processes a packet and a route. At an IP layer, ARP is used to convert an IP address into a physical address, RARP is used to convert a physical address into an IP address, and ICMP is used to report an error and transmit control information.

The transport layer corresponds to a transport layer in the OSI 7-layer reference model, and provides an end-to-end communication service, that is, communication between applications. The transport layer is mainly configured to perform data formatting, data validation, retransmission of lost data, and the like. The transport layer may include two protocols: TCP and UDP. TCP provides a reliable connection-oriented service, and UDP provides a simple connectionless service.

The application layer corresponds to an application layer, a presentation layer, and a session layer in the OSI 7-layer reference model, and provides an application layer protocol for a user. The application layer protocol may include but is not limited to Finger, a domain name query protocol such as WHOIS, file transfer protocol (FTP) used for file transfer, Gopher, a HyperText Transfer Protocol (HTTP) for Web browsing, Telnet, a Simple Mail Transfer Protocol (SMTP), Internet Relay Chat (IRC), a Network News Transfer Protocol (NNTP), an Internet Mail Access Protocol (IMAP) for email, and the like. Further, one or more applications run at the application layer. Generally, an application exchanges information with an operating system through an API. The API may be a set of socket interface functions. This set of interface functions may implement a plurality of functionalities, that is, a plurality of modules, for example, a monitoring module (for example, implement a functionality of monitoring various connection status parameters such as TCP using a select( ) function), a receiving module (that is, implement a receiving functionality using a receive( ) function), a sending module (that is, implement a sending functionality using a send( ) function), a writing module (that is, implement a writing functionality using a write( ) function), and a reading module (that is, implement a reading functionality using a read( ) function). The API may be developed by a user, or may be obtained by improving an existing API. Certainly, the foregoing description is merely an example. A functionality may be implemented in a plurality of manners. For example, the functionality may be implemented using a plurality of functions, or may be implemented in cooperation with a plurality of functions in an implementation. This is not limited in this application. For example, an implementation of the monitoring module in some scenarios may be a poll( ) function.

In this application, there may be one or more socket connections between each application and the operating system, each socket connection corresponds to one socket, and each socket has one set of socket interface functions. Therefore, both the application and the operating system may perform operations such as data sending and receiving, real-time status obtaining, and information exchange using this set of socket interface functions.

For example, the operating system or the application may call a select( ) function in a socket to perform real-time monitoring on various status parameters related to a socket connection, for example, a status identifier of a connection between the operating system and the application, an identifier of the socket connection, and a data readable identifier, or may call a read( ) function in the socket to read data.

In an actual application process, to avoid frequent system calls, the operating system may buffer data of a socket connection in a kernel buffer. The data of the socket connection is from data of an underlying protocol stack, and the underlying protocol stack is usually a protocol stack below the transport layer in FIG. 2, for example, the network interface layer or the data link layer. The kernel buffer may implement a protocol stack of the transport layer in FIG. 2, and data in the kernel buffer may be stored in the memory in FIG. 1.

In addition, the operating system may monitor a size relationship between data of a socket and a lowest water mark by calling the monitoring module. As the data of the socket connection buffered in the kernel buffer continuously increases, when detecting that the data of the socket connection is greater than or equal to the lowest water mark, the monitoring module generates a data readable identifier, and returns the data readable identifier to the operating system. Further, the operating system may send the data of the socket connection received in the kernel buffer to a receive window of the socket connection such that the application can call, based on the data readable identifier generated by the monitoring module, a reading module to read the data of the socket connection from the receive window corresponding to the socket connection.

The lowest water mark is maximum available space of the data to be received by the application in the kernel buffer. The lowest water mark may be fixed or dynamically set, and may be set based on at least one of the following indicators: available space of the data to be received by the application in the kernel buffer, a latency of a network used by the socket connection, a packet loss rate of the network used by the socket connection, bandwidth of the network used by the socket connection, a maximum value of a receive window corresponding to the socket connection, and a communication requirement type of the application.

Generally, if the available space of the data to be received by the application in the kernel buffer is larger, a larger value may be set for the lowest water mark. If the latency of the network used by the socket connection is less sensitive, a larger value may be set for the lowest water mark. If the packet loss rate of the network used by the socket connection is lower, a larger value may be set for the lowest water mark. If the bandwidth of the network used by the socket connection is wider, a larger value may be set for the lowest water mark. If the maximum value of the receive window corresponding to the socket connection is larger, a larger value may be set for the lowest water mark. Generally, the lowest water mark is less than the maximum value of the receive window. If the lowest water mark is greater than or equal to the maximum value of the receive window, the maximum value of the receive window may be re-adjusted to be several times the lowest water mark.

The communication requirement type is a characteristic of exchanging data between the application and the operating system in a communication process. The communication requirement type may be determined using an attribute of the application or parameters such as an upload amount and a download amount of the application, and may include but is not limited to a throughput requirement type and a latency requirement type.

Further, the application may be a high-throughput application, a low-throughput application, a latency-insensitive application, a latency-sensitive application, or the like. For example, an application A is a file storage application program, and it may be determined, based on an attribute of the application A, that the application A is a latency-insensitive application. For another example, the application A is a video player, and it may be determined, based on an attribute of the application A, that the application A is a latency-sensitive application. However, when the application A has 50% video buffering, it may be determined that the application A is a latency-insensitive application. Generally, for a latency-insensitive application, a larger value may be set for the lowest water mark, and for a latency-sensitive application, a smaller value may be set for the lowest water mark.

However, when the operating system receives a relatively small amount of data from the underlying protocol stack, the data of the socket connection is less than the lowest water mark for a long time, and the operating system continues buffering the data of the socket connection in the kernel buffer, but does not send the data of the socket connection to the application. For this case, the application may resolve the problem by re-adjusting the lowest water mark. However, in a process of resetting the lowest water mark, a plurality of system calls are required. As a result, this manner is difficult to be applicable to a scenario in which there are a lot of socket connections, and a communication requirement of a device cannot be met.

To resolve the foregoing problem, this application provides a data processing method and apparatus, and a device such that a quantity of system calls can be reduced based on receiving data by an application in a device, thereby saving resources of the device and reducing power consumption of the device. The following describes in detail a specific implementation process of the data processing method in this application with reference to FIG. 3 using the operating system and the application in FIG. 2 as an execution body.

Figure 3:
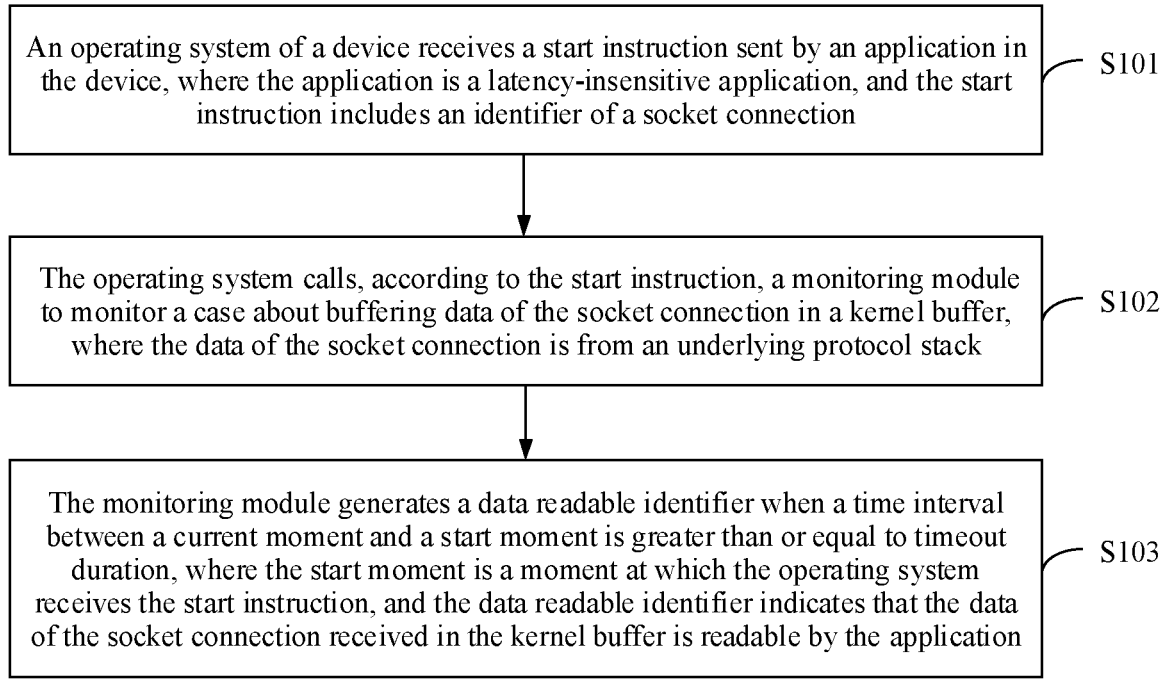
FIG. 3 is a schematic flowchart of a data processing method according to an embodiment of this application.

FIG. 3 is a schematic flowchart of a data processing method according to an embodiment of this application. As shown in FIG. 3, the data processing method in this application may include the following steps.

S101. An operating system of a device receives a start instruction sent by an application in the device, where the application is a latency-insensitive application, and the start instruction includes an identifier of a socket connection.

A person skilled in the art may understand that the application may have different communication requirement types in different scenarios, at different moments, and with different subjective and objective factors. When the application is a latency-insensitive application, either the application itself has a low requirement on a latency, or the application has a low requirement on a latency in a current scenario. In this case, the application does not urgently need to receive data of the socket connection that is received in a kernel buffer and sent by the operating system.

The application may determine, by determining whether a communication requirement type set by the application is a latency-insensitive type, or may determine, based on whether data buffered in the application is greater than a preset value, whether the application is currently a latency-insensitive application. The preset value may be set based on actual experience. This is not limited in this application.

Further, an interface SO_RCVLOWAT_TIMEOUT may be set in the application and the operating system. Therefore, when the application is a latency-insensitive application, the application may call the interface SO_RCVLOWAT_TIMEOUT to send, to the operating system, the start instruction including the identifier of the socket connection, to notify, using the start instruction, the operating system that the application may currently slowly receive the data of the socket connection received in the kernel buffer.

A specific structure of the interface SO_RCVLOWAT_TIMEOUT is as follows:

```
struct rcvlowat_timeout Interface name {
uint32_t rcvlowat; Lowest water mark
uint64_t timeout; Timeout duration
};
``` where, parameters rcvlowat and timeout may be omitted.

In this application, before the application sends the start instruction to the operating system, the application needs to learn of the identifier of the socket connection. The identifier of the socket connection may be established in advance, or may be established before the start instruction is sent. There may be one or more socket connections.

The following uses a process of establishing one socket connection as an example to describe in detail a specific process in which the application learns of an identifier of the socket connection.

The application may send a connection establishment instruction to the operating system, for example, an I/O operation instruction. The connection establishment instruction may be some actions or behavior performed by the user on the application, or may be generated by the application in a running process to execute a task.

For example, the application is a browser, and the user clicks a link displayed on the browser, or enters an account or a password of a website. In this case, data of the link or the account or the password entered by the user is the connection establishment instruction sent by the application to the operating system.

For another example, the application is a video player. To buffer a video watched by the user in the video player, request data that needs to be sent to the operating system is generated. In this case, the request data is the connection establishment instruction.

It should be noted that, in addition to passively receiving the connection establishment instruction sent by the application, the operating system may monitor a network in real time by calling a monitoring module, and wait for a connection establishment request sent by the application.

Further, the operating system may establish, based on the connection establishment request, the socket connection corresponding to the application, allocate the corresponding identifier to the socket connection, and store the identifier of the socket connection in a local buffer, where data in the local buffer may be stored in the memory in FIG. 1. Further, the application may read the identifier of the socket connection from the local buffer.

The identifier of the socket connection is used to uniquely indicate the socket connection such that the operating system can determine, based on the identifier, the corresponding socket connection, the application corresponding to the socket connection, and a set of socket interface functions corresponding to the socket connection. A specific implementation form of the identifier is not limited in this application. For example, the identifier may be a file descriptor (FD) of the socket connection.

In this application, the start instruction may be a packet in the other approaches, or may be in another form. This is not limited in this application. For example, the start instruction enables, in a form of a frame header and a data packet, the identifier of the socket connection to be carried in the data packet.

Further, specific content of the start instruction is not limited in this application either. When the start instruction includes the identifier of the socket connection, the operating system may determine, based on a prestored mapping relationship between the identifier of the socket connection, and a lowest water mark and timeout duration, the lowest water mark and the timeout duration that are corresponding to the identifier of the socket connection.

A manner in which the operating system determines the lowest water mark and the timeout duration is not limited in this application. Optionally, the operating system may prestore a table including the identifier of the socket connection, the lowest water mark, and a mapping relationship between the identifier of the socket connection and the lowest water mark such that the operating system can determine, through table lookup, the lowest water mark corresponding to the identifier of the socket connection. Correspondingly, the operating system may prestore a table including the identifier of the socket connection, the timeout duration, and a mapping relationship between the identifier of the socket connection and the timeout duration such that the operating system can determine, through table lookup, the timeout duration corresponding to the identifier of the socket connection. The mapping relationship may be in a form of code, a number, an identifier, or the like.

Further, the application may alternatively add the lowest water mark and/or the timeout duration to the start instruction such that the operating system can determine a communication requirement type of the current application based on the received lowest water mark and/or timeout duration, to adjust a data receiving rate of the application to meet an actual requirement of the application.

The timeout duration is maximum duration of buffering the data of the socket connection in the kernel buffer. A specific form of the timeout duration is not limited in this application. Optionally, the timeout duration is set based on at least one of the following indicators: a latency of a network used by the socket connection, bandwidth of the network used by the socket connection, a packet loss rate of the network used by the socket connection, and a communication requirement type of the application.

Generally, if the latency of the network used by the socket connection is less sensitive, a larger value may be set for the timeout duration. If the packet loss rate of the network used by the socket connection is lower, a larger value may be set for the timeout duration. If the bandwidth of the network used by the socket connection is wider, a larger value may be set for the timeout duration.

For the communication requirement type of the application, refer to specific content of the communication requirement type of the application when the lowest water mark is set in this application. Details are not described herein again. Generally, for a latency-insensitive application, a larger value may be set for the timeout duration, and for a latency-sensitive application, a smaller value may be set for the timeout duration.

In addition, the operating system may determine the lowest water mark based on the timeout duration, or may determine the timeout duration based on the lowest water mark. For a specific manner, refer to specific content of determining the lowest water mark and the timeout duration based on the identifier of the socket connection. Details are not described herein again.

S102. The operating system calls, according to the start instruction, a monitoring module to monitor a case about buffering data of the socket connection in a kernel buffer, where the data of the socket connection is from an underlying protocol stack.

In this application, the operating system may call the monitoring module to monitor the case about buffering the data of the socket connection in the kernel buffer. That is, the operating system may call a select( ) function, and may obtain status information returned by the select( ) function. The status information indicates the case about buffering the data of the socket connection in the kernel buffer.

The case may be duration of buffering the data of the socket connection in the kernel buffer, or may be an amount of the data of the socket connection buffered in the kernel buffer, or may be another parameter. This is not limited in this application.

The current application is insensitive to a latency requirement, and based on the content in S101, the operating system may obtain the timeout duration according to the received start instruction. Therefore, the operating system may call the monitoring module to perform monitoring to learn whether the duration of buffering the data of the socket connection in the kernel buffer exceeds the timeout duration, to slow down a data receiving speed of the application and meet an actual requirement of the application.

The monitoring module may use a timer to determine whether the duration of buffering the data of the socket connection in the kernel buffer exceeds the timeout duration, that is, whether a time interval between a current moment and a start moment is greater than or equal to the timeout duration. The monitoring module may start the timer at a moment of receiving the start instruction (the start moment), and set duration of the timer to the timeout duration. Further, the monitoring module determines, by performing monitoring to learn whether the timer returns an identifier, whether the time interval between the current moment and the start moment is greater than or equal to the timeout duration. The timer may be preset by the monitoring module, or may be temporarily set when the start instruction is received.

When the monitoring module receives a non-timeout identifier or does not receive any identifier, the monitoring module may determine that the time interval between the current moment and the start moment is less than the timeout duration. When the monitoring module receives a timeout identifier, the monitoring module may determine that the time interval between the current moment and the start moment is greater than or equal to the timeout duration.

In this application, the start moment and the current moment may be represented in a same manner, thereby facilitating calculation of the time interval between the current moment and the start moment.

The timer in this application may be implemented in a plurality of manners. This is not limited. For example, the timer may be counted down, and timeout means that a time of the timer elapses.

The start moment and the current moment each may be an absolute time. For example, if the start moment is 10:10 and the current moment is 10:11, the time interval between the current moment and the start moment is one minute. The start moment and the current moment each may be alternatively a relative time. For example, if the start moment is 0, and the current moment is 10 s starting from 0, the time interval between the current moment and the start moment is 10 s.

S103. The monitoring module generates a data readable identifier when a time interval between a current moment and a start moment is greater than or equal to timeout duration, where the start moment is a moment at which the operating system receives the start instruction, and the data readable identifier indicates that the data of the socket connection received in the kernel buffer is readable by the application.

In this application, when the time interval between the current moment and the start moment is greater than or equal to the timeout duration, the timer expires, and the monitoring module may generate a first data readable identifier (the data readable identifier in S103). Further, the operating system may receive the first data readable identifier generated by the monitoring module. Therefore, it is determined that the maximum duration of buffering the data of the socket connection in the kernel buffer elapses. Further, the application also calls the reading module based on the first data readable identifier generated by the monitoring module, to read the data of the socket connection received in the kernel buffer, thereby slowing down a process of receiving the data by the application, meeting an actual requirement of the application, and reducing transmission pressure of the device.

Further, the data of the socket connection may not be received in the kernel buffer. Therefore, to prevent the application from reading null data, when the time interval between the current moment and the start moment is greater than or equal to the timeout duration, the monitoring module may determine whether the data of the socket connection is buffered in the kernel buffer.

Further, when the data of the socket connection is buffered in the kernel buffer, the application may receive a first data readable identifier generated by the monitoring module. When determining that the data of the socket connection is not buffered in the kernel buffer, the monitoring module may continue waiting to receive the data of the socket connection, or exit by triggering another event, thereby reducing a quantity of system calls and reducing processing pressure of the device.

In addition, based on the content in S101, in addition to obtaining the timeout duration according to the start instruction, the operating system may obtain the lowest water mark. Further, the operating system may call the monitoring module to monitor not only the duration of buffering the data of the socket connection in the kernel buffer, but also the amount of the data of the socket connection buffered in the kernel buffer.

Further, impact of the two parameters: the timeout duration and the lowest water mark, is considered. In a process of performing monitoring to learn whether the time interval between the current moment and the start moment exceeds the timeout duration, the monitoring module may further perform monitoring to learn whether the data of the socket connection buffered in the kernel buffer exceeds the lowest water mark. That is, in a process from calling, by the operating system according to the start instruction, the monitoring module to monitor the kernel buffer to sending, by the monitoring module, the data readable identifier to the application, the monitoring module performs monitoring to learn whether the data of the socket connection buffered in the kernel buffer exceeds the lowest water mark.

When the time interval between the current moment and the start moment is less than the timeout duration, the monitoring module may perform monitoring to learn whether the data of the socket connection buffered in the kernel buffer exceeds the lowest water mark. Further, once the monitoring module learns, through monitoring, that the data of the socket connection in the kernel buffer is greater than or equal to the lowest water mark, that is, maximum available space of the data to be received by the application in the kernel buffer is full, the monitoring module may generate a second data readable identifier such that the application reads the received data of the socket connection in time based on the second data readable identifier, thereby reducing storage pressure of the kernel buffer and storage costs of the device. Otherwise, the module in the operating system may continue performing monitoring to learn whether the time interval between the current moment and the start moment is greater than or equal to the timeout duration, and perform step S103 when the time interval between the current moment and the start moment is greater than or equal to the timeout duration.

Specific forms of the first data readable identifier and the second data readable identifier may be the same or may be different, and may be in a form of an identifier, a number, code, or the like. This is not limited in this application. For example, when the first data readable identifier and the second data readable identifier are "1", it indicates that the data is readable. When the first data readable identifier and the second data readable identifier are "0", it indicates that the data is unreadable.

Further, when receiving the first data readable identifier or the second data readable identifier generated by the monitoring module, the operating system may send the data of the socket connection received in the kernel buffer to a receive window of the socket connection such that the application can call, based on the first data readable identifier or the second data readable identifier generated by the monitoring module, the reading module to read the data of the socket connection from the receive window corresponding to the socket connection.

According to the data processing method provided in this application, when the application in the device is a latency-insensitive application, the application may send the start instruction including the identifier of the socket connection to the operating system of the device, and the operating system may determine that the current application may slowly receive the data. The operating system calls, according to the start instruction, the monitoring module to monitor the case about buffering the data of the socket connection in the kernel buffer, where the data of the socket connection is from the underlying protocol stack. Further, the monitoring module generates the data readable identifier when the time interval between the current moment and the start moment is greater than or equal to the timeout duration, and the operating system may receive the data readable identifier generated by the monitoring module, where the start moment is the moment at which the operating system receives the start instruction, and the data readable identifier indicates that the data of the socket connection received in the kernel buffer is readable by the application. Therefore, the operating system may send the data of the socket connection received in the kernel buffer to the receive window of the socket connection such that the application can call, based on the data readable identifier generated by the monitoring module, the reading module to read the data of the socket connection from the receive window corresponding to the socket connection. In this application, a data buffering process is optimized through time restriction, and a process in which the application slowly receives the data is implemented to meet an actual requirement of the application such that a balance between device consumption and a latency is optimal, a problem that an additional system call is required due to an insufficient data amount is resolved, and an energy loss of the device is reduced, thereby saving resources of the device and reducing power consumption of the device.

Figure 4:
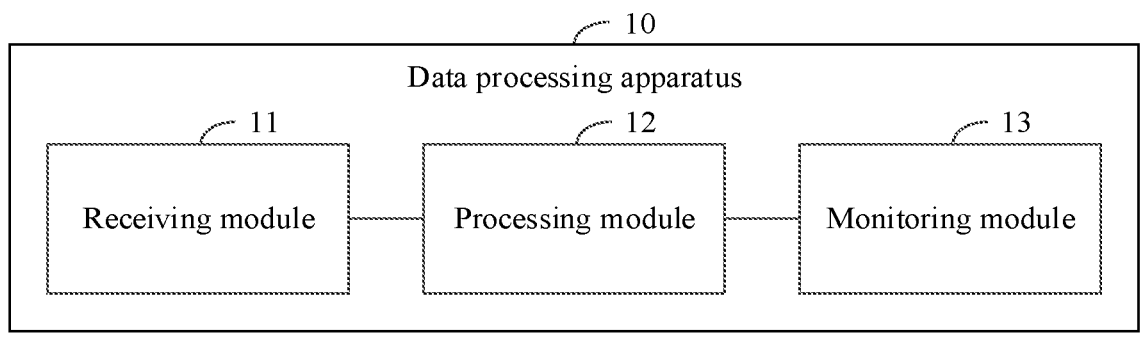
FIG. 4 is a schematic diagram of a structure of a data processing apparatus according to an embodiment of this application.

For example, an embodiment of this application further provides a data processing apparatus. FIG. 4 is a schematic structural diagram of a data processing apparatus according to an embodiment of this application. A data processing apparatus 10 is configured to implement the operations corresponding to the operating system of the device in any one of the foregoing method embodiments. As shown in FIG. 4, the data processing apparatus 10 may include a receiving module 11 and a processing module 12.

The receiving module 11 is configured to receive a start instruction sent by an application in a device, where the application is a latency-insensitive application, and the start instruction includes an identifier of a socket connection.

The processing module 12 is configured to call, according to the start instruction, a monitoring module 13 to monitor a case about buffering data of the socket connection in a kernel buffer, where the data of the socket connection is from an underlying protocol stack.

The monitoring module 13 is further configured to generate a data readable identifier when a time interval between a current moment and a start moment is greater than or equal to timeout duration, where the start moment is a moment at which an operating system of the device receives the start instruction, and the data readable identifier indicates that the data of the socket connection received in the kernel buffer is readable by the application.

In some embodiments, the monitoring module includes a timer, duration of the timer is the timeout duration, and the processing module 12 is further configured to start the timer according to the start instruction.

In some embodiments, the monitoring module 13 is further configured to when the timer expires, determine that the data of the socket connection is buffered in the kernel buffer.

In some embodiments, the processing module 12 is further configured to call, according to the start instruction, the monitoring module to perform monitoring to learn whether the data of the socket connection buffered in the kernel buffer exceeds a lowest water mark.

In some embodiments, the monitoring module 13 is configured to, in a process from calling, according to the start instruction, the monitoring module to monitor the kernel buffer to sending, by the monitoring module, the data readable identifier to the application, learn, through monitoring, that the data of the socket connection buffered in the kernel buffer does not exceed the lowest water mark.

In some embodiments, the timeout duration is set based on at least one of the following indicators: a latency of a network used by the socket connection, bandwidth of the network used by the socket connection, a packet loss rate of the network used by the socket connection, and a communication requirement type of the application.

In some embodiments, the lowest water mark is set based on at least one of the following indicators: available space of the data to be received by the application in the kernel buffer, a latency of a network used by the socket connection, a packet loss rate of the network used by the socket connection, bandwidth of the network used by the socket connection, a maximum value of a receive window corresponding to the socket connection, and a communication requirement type of the application.

In some embodiments, the monitoring module is a select( ) function.

In some embodiments, the operating system stores a mapping relationship between the identifier of the socket connection and the timeout duration.

In some embodiments, the start instruction further includes the timeout duration.

The data processing apparatus in this embodiment may be configured to perform the technical solution of the device in the method embodiment shown in FIG. 1 to FIG. 3. An implementation principle and a technical effect of the data processing apparatus are similar to those in the method embodiment. For the operation implemented by each module, further refer to the related descriptions in the method embodiment. Details are not described herein again. The module herein may be alternatively a component or a circuit.

In this application, functional modules in the data processing apparatus may be obtained through division according to the foregoing method examples. For example, each functional module corresponding to each functionality may be obtained through division, or two or more functionalities may be integrated in one processing module. In an implementation, the foregoing apparatus is a part of the operating system. The integrated module may be implemented in a form of hardware, or may be implemented in a form of a software functional module. It should be noted that, in this embodiment of this application, module division is exemplary, and is merely a logical function division. In actual implementation, another division manner may be used.

Figure 5:
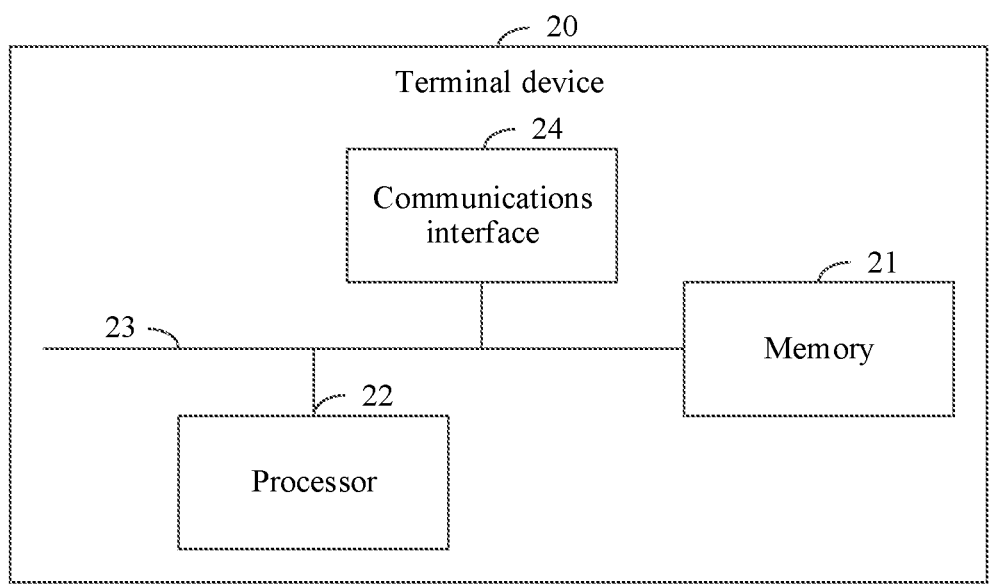
FIG. 5 is a schematic diagram of a structure of a device according to an embodiment of this application.

FIG. 5 is a schematic structural diagram of a device 20 according to an embodiment of this application. As shown in FIG. 5, the device 20 includes a memory 21 and a processor 22.

The memory 21 is configured to store a program instruction, and the memory 21 may be a flash (flash storage). The memory 21 further stores an operating system of the device and an application in the device.

The processor 22 is configured to call and execute the program instruction in the memory, to implement the steps of the corresponding device in the data processing method in FIG. 1 to FIG. 3. For details, refer to the related descriptions in the foregoing method embodiment.

The device 20 may further include an I/O interface 23. The I/O interface 23 may include an independent output interface and an independent input interface, or may be an integrated interface that integrates input and output. The output interface is configured to output data, and the input interface is configured to obtain input data. The output data is a general term of output in the foregoing method embodiment, and the input data is a general term of input in the foregoing method embodiment.

The device 20 may be configured to perform the steps and/or the procedures corresponding to the corresponding device in the foregoing method embodiment.

This application further provides a readable storage medium. The readable storage medium stores an executable instruction, and when at least one processor of a terminal device executes the executable instruction, the terminal device performs the data processing method in the foregoing method embodiment.

This application further provides a program product. The program product includes an executable instruction, and the executable instruction is stored in a readable storage medium. At least one processor of a device may read the executable instruction from the readable storage medium, and the at least one processor executes the executable instruction to enable the device to perform the data processing method in the foregoing method embodiment.

This application further provides a chip. The chip is connected to a memory, or the memory is integrated into the chip, and when a software program stored in the memory is executed, the data processing method in the foregoing method embodiment is implemented.

A person of ordinary skill in the art may understand that all or some of the foregoing embodiments may be implemented using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, digital versatile disc (DVD)), a semiconductor medium (for example, a solid-state drive (SSD)), or the like.

What is claimed is:
1. A data processing method, comprising:
    receiving, by an operating system of a device, a start instruction from a latency-insensitive application in the device, wherein the start instruction comprises an identifier of a socket connection;

calling, by the operating system according to the start instruction, a monitoring system of the device to monitor buffering of first data of the socket connection in a kernel buffer, wherein the first data is from an underlying protocol stack; and generating, by the monitoring system in response to the calling, a data readable identifier when a time interval between a current moment and a start moment is greater than or equal to a timeout duration, wherein the start moment is when the operating system receives the start instruction, and wherein the data readable identifier indicates that the first data is readable by the latency-insensitive application.

2. The data processing method of claim 1, wherein the monitoring system comprises a timer, wherein a first duration of the timer is the timeout duration, and wherein the method further comprises starting, by the operating system, the timer according to the start instruction.

3. The data processing method of claim 2, further comprising determining, by the monitoring system, that the first data is buffered in the kernel buffer when the timer expires.

4. The data processing method of claim 1, further comprising calling, by the operating system according to the start instruction, the monitoring system to perform monitoring to learn whether the first data exceeds a lowest water mark.

5. The data processing method of claim 4, further comprising:
sending, by the monitoring system, the data readable identifier to the latency-insensitive application; and
learning, by the monitoring system through the monitoring, that the first data does not exceed the lowest water mark.

6. The data processing method of claim 4, wherein the lowest water mark is set based on at least one of:
an available space of second data to be received by the latency-insensitive application in the kernel buffer;
a latency of a network used by the socket connection;
a packet loss rate of the network;
a bandwidth of the network;
a maximum value of a receive window corresponding to the socket connection; or
a communication requirement type of the latency-insensitive application.

7. The data processing method of claim 1, wherein the timeout duration is set based on at least one of:
a latency of a network used by the socket connection;
a bandwidth of the network;
a packet loss rate of the network; or
a communication requirement type of the latency-insensitive application.

8. The data processing method of claim 1, wherein the monitoring system is a select( ) function.

9. The data processing method of claim 1, further comprising storing, by the operating system, a mapping relationship between the identifier of the socket connection and the timeout duration.

10. The data processing method of claim 1, wherein the start instruction further comprises the timeout duration.

11. A device comprising:
an operating system;
a monitoring system;
a memory configured to store program instructions; and
a processor coupled to the memory, wherein the program instructions cause the processor to be configured to:

receive, using the operating system, a start instruction from a latency-insensitive application, wherein the start instruction comprises an identifier of a socket connection;

call, using the operating system according to the start instruction, the monitoring system to monitor buffering of first data of the socket connection in a kernel buffer, wherein the first data is from an underlying protocol stack; and generate, using the monitoring system in response to the calling, a data readable identifier when a time interval between a current moment and a start moment is greater than or equal to a timeout duration, wherein the start moment when the processor receives the start instruction, and wherein the data readable identifier indicates that the first data is readable by the latency-insensitive application.

12. The device of claim 11, wherein the monitoring system comprises a timer, wherein a first duration of the timer is the timeout duration, and wherein the program instructions further cause the processor to be configured to start, using the operating system, the timer according to the start instruction.

13. The device of claim 12, wherein the program instructions further cause the processor to be configured to determine, using the monitoring system, that the first data is buffered in the kernel buffer when the timer expires.

14. The device of claim 11, wherein the program instructions further cause the processor to be configured to call, using the operating system according to the start instruction, the monitoring system to perform monitoring to learn whether the first data in the kernel buffer exceeds a lowest water mark.

15. The device of claim 14, wherein the program instructions further cause the processor to be configured to:
send, using the monitoring system, the data readable identifier to the latency-insensitive application; and
learn, using the monitoring system through the monitoring, that the first data does not exceed the lowest water mark.

16. The device of claim 14, wherein the lowest water mark is set based on at least one of:
an available space of second data to be received by the latency-insensitive application in the kernel buffer;
a latency of a network used by the socket connection;
a packet loss rate of the network;
a bandwidth of the network;
a maximum value of a receive window corresponding to the socket connection; or
a communication requirement type of the latency-insensitive application.

17. The device of claim 11, wherein the timeout duration is set based on at least one of:
a latency of a network used by the socket connection;
a bandwidth of the network;
a packet loss rate of the network; or
a communication requirement type of the latency-insensitive application.

18. A computer program product comprising computer-executable instructions for storage on a non-transitory computer-readable medium that, when executed by a processor, cause a device to:
receive, by an operating system of the device, a start instruction from a latency-insensitive application in the device, wherein the start instruction comprises an identifier of a socket connection;

call, by the operating system according to the start instruction, a monitoring system of the device to monitor buffering of first data of the socket connection in a kernel buffer, wherein the first data is from an underlying protocol stack; and generate, by the monitoring system in response to the calling, a data readable identifier when a time interval between a current moment and a start moment is greater than or equal to a timeout duration, wherein the start moment is when the operating system receives the start instruction, and wherein the data readable identifier indicates that the first data is readable by the latency-insensitive application.

19. The computer program product of claim 18, wherein the monitoring system is a select( ) function.

20. The computer program product of claim 18, wherein the start instruction further comprises the timeout duration.

\* \* \* \* \*